(12) United States Patent
Jiang et al.

(10) Patent No.: US 11,894,951 B2
(45) Date of Patent: Feb. 6, 2024

(54) TRANSMISSION LINK CONFIGURATION USING REFERENCE SIGNAL MAPPING

(71) Applicant: ZTE Corporation, Guangdong (CN)

(72) Inventors: Chuangxin Jiang, Guangdong (CN); Shujuan Zhang, Guangdong (CN); Zhaohua Lu, Guangdong (CN); Bo Gao, Guangdong (CN); Meng Mei, Guangdong (CN)

(73) Assignee: ZTE Corporation, Guangdong (CN)

( * ) Notice: Subject to any disclaimer, the term of this patent is extended or adjusted under 35 U.S.C. 154(b) by 533 days.

(21) Appl. No.: 17/135,103

(22) Filed: Dec. 28, 2020

(65) Prior Publication Data

US 2021/0152397 A1 May 20, 2021

Related U.S. Application Data

(63) Continuation of application No. PCT/CN2018/093334, filed on Jun. 28, 2018.

(51) Int. Cl.
*H04L 25/02* (2006.01)
*H04B 7/06* (2006.01)
(Continued)

(52) U.S. Cl.
CPC ....... *H04L 25/0226* (2013.01); *H04B 7/0695* (2013.01); *H04L 5/0048* (2013.01);
(Continued)

(58) Field of Classification Search
CPC . H04L 25/0226; H04L 5/0048; H04L 5/0094; H04L 5/0044; H04B 7/0695;
(Continued)

(56) References Cited

U.S. PATENT DOCUMENTS

| 10,812,239 B2 | 10/2020 | Gao et al. |
| 2011/0243262 A1* | 10/2011 | Ratasuk .................. H04L 5/003 |
| | | 375/260 |

(Continued)

FOREIGN PATENT DOCUMENTS

| CA | 3025808 A1 | 1/2018 |
| CN | 103220102 A | 7/2013 |

(Continued)

OTHER PUBLICATIONS

Russian Search Report, dated Apr. 14, 2021, RU Application No. 2021101674, filed Jun. 28, 2018, 4 pages (with unofficial translation).

(Continued)

*Primary Examiner* — Afshawn M Towfighi
(74) *Attorney, Agent, or Firm* — Perkins Coie LLP

(57) ABSTRACT

Methods, systems and devices for transmission link configuration using reference signal mapping in next generation cellular networks are described. An example method for wireless communication, based on the disclosed technology, includes transmitting data over at least one transmission link that is configured based on a mapping between two reference signals, each of which is configured with different subsets of one or more network parameters. Another example method includes dividing a plurality of SRS (sounding reference signal) resource sets into a plurality of groups based on network parameters of SRS resources or SRS resource sets, and transmitting, within one of the plurality of groups, only one SRS resource in each of multiple SRS resource sets at an identical time, where the SRS resources in different SRS resource sets can be transmitted simultaneously. The methods described may include beam management implementations for wireless communications.

12 Claims, 6 Drawing Sheets

(51) Int. Cl.
  *H04L 5/00* (2006.01)
  *H04W 72/0446* (2023.01)
  *H04W 72/0453* (2023.01)
  *H04W 72/53* (2023.01)

(52) U.S. Cl.
  CPC ... *H04W 72/0446* (2013.01); *H04W 72/0453* (2013.01); *H04W 72/53* (2023.01)

(58) Field of Classification Search
  CPC ......... H04W 72/0446; H04W 72/0453; H04W 72/53; Y02D 30/70
  See application file for complete search history.

(56) References Cited

U.S. PATENT DOCUMENTS

| | | |
|---|---|---|
| 2014/0036859 A1 | 2/2014 | Ekpenyong et al. |
| 2014/0155479 A1 | 6/2014 | Reddell et al. |
| 2021/0135823 A1* | 5/2021 | Zhang ................. H04B 7/0604 |

FOREIGN PATENT DOCUMENTS

| | | |
|---|---|---|
| CN | 105848165 A | 8/2016 |
| CN | 107852199 | 3/2018 |
| CN | 108024365 | 5/2018 |
| CN | 108111278 A | 6/2018 |
| CN | 108111279 | 6/2018 |
| CN | 108111278 B | 9/2020 |
| EP | 2 991 238 A1 | 2/2016 |
| JP | 2010-178129 | 8/2010 |
| RU | 2016 143 988 A | 5/2018 |
| WO | 2016/163841 A1 | 10/2016 |
| WO | 2017/095126 A1 | 6/2017 |

OTHER PUBLICATIONS

NTT DOCOMO, Inc. "Study on New Radio Access Technology," 3GPP TSG RAN meeting #75 Dubrovnik, Croatia, Mar. 6-9, 2017, RP-170376, 87 pages.
Co-Pending CN Application Office action dated Mar. 22, 2022, CN Appl No. 202110744899.8, 14 pages with unofficial translation.
Huawei et al., "Summary of remaining issues on bandwidth part and wideband operation," 3GPP TSG RAN WG1 #92, Athens, Greece, R1-1801347, Feb. 26-Mar. 2, 2018, 13 pages.
CNIPA, Notification to Complete Formalities of Registration for Chinese Application No. 202110744899.8, dated Jan. 5, 2023, 6 pages with unofficial translation.
European Search Report, dated Oct. 5, 2021, EP Application No. 18923888.4, 13 pages.
Sony, "Summary of SRS" 3GPP TSG RAN WG1 Meeting #92-Bis Sanya, China, R1-1805678, Apr. 16-20, 2018, 49 pages.
CATT, "Further discussion on remaining issues on SRS," 3GPP TSG RAN WG1 Meeting 90bis Prague, Cz, R1-1717820 , Oct. 9-13, 2017, 4 pages.
International Search Report and Written Opinion, PCT/CN2018/093334, dated Mar. 7, 2019, 9 pages.
ZTE, "Maintenance for beam management" 3GPP TSG RAN WG1 Meeting #94 R1-1808196, Gothenburg, Sweden, Aug. 20-24, 2018, 10 pages.
3GPP "Radio Resource Control(RRC) protocol specification" (Release 15),3GPP TS 38.331 V15.2.0(Jun. 2018), Jun. 20, 2018, 6 pages.
Guangdong OPPO Mobile Telecom "Further discussion on SRS design for NR," 3GPP TSG RAN WG1 Meeting NR#3 R1-1715674, 6 pages.
Co-Pending JP Application Office action dated Mar. 3, 2022, JP Appl No. 2020-572899, 8 pages with unofficial translation.

* cited by examiner

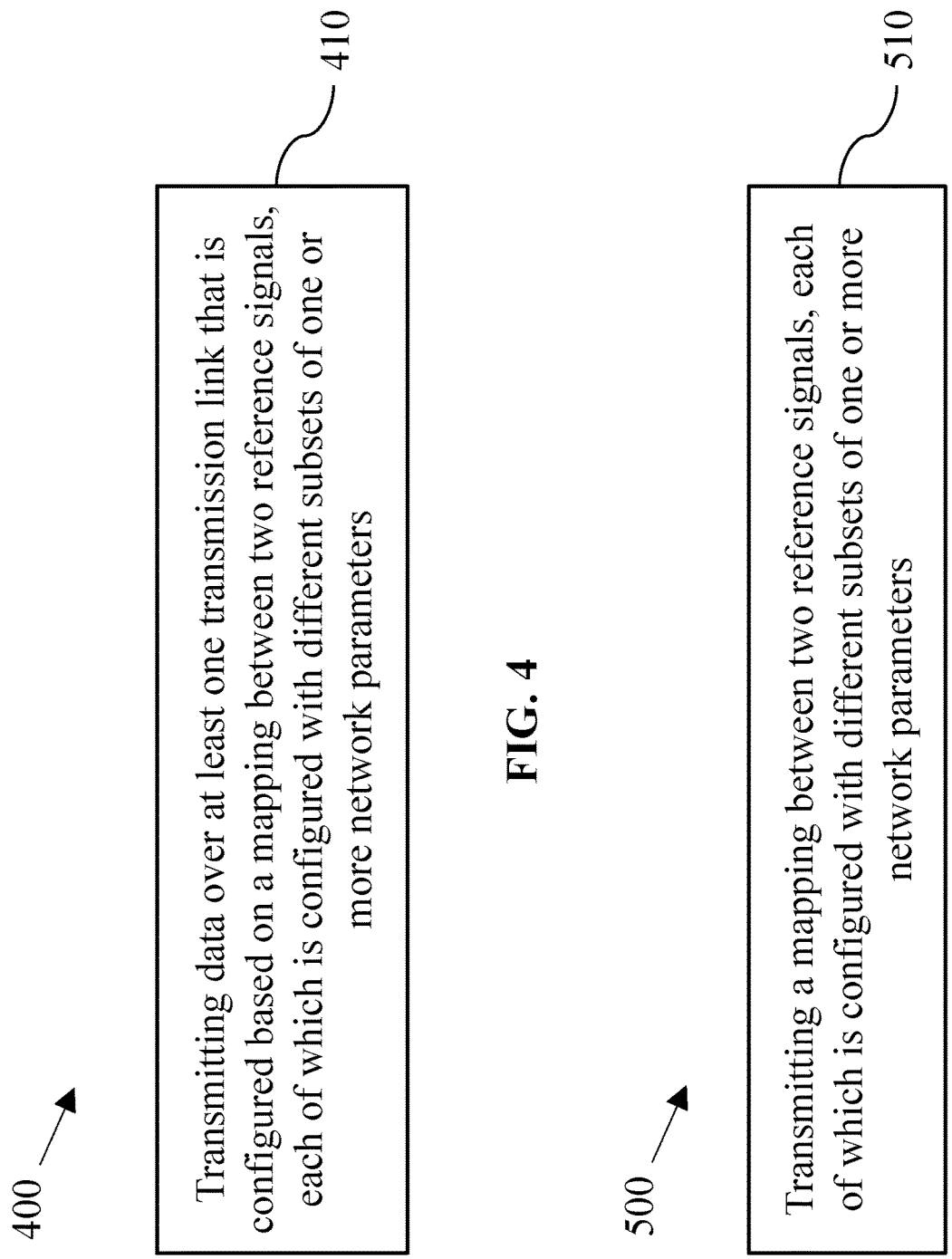

US 11,894,951 B2

TRANSMISSION LINK CONFIGURATION USING REFERENCE SIGNAL MAPPING

CROSS REFERENCE TO RELATED APPLICATIONS

This patent document is a continuation of and claims benefit of priority to International Patent Application No. PCT/CN2018/093334, filed on Jun. 28, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring robust and efficient configuring of communication links.

SUMMARY

This document relates to methods, systems, and devices for transmission link configuration using reference signal mapping in New Radio (NR) wireless networks. In an example, configuring transmission links using reference signal mapping includes beam management, which enables support for high throughputs for multiple devices scattered in all directions across multiple component carriers (CCs) and bandwidth parts (BWPs).

In one exemplary aspect, a wireless communication method is disclosed. The method includes transmitting data over at least one transmission link that is configured based on a mapping between two reference signals, each of which is configured with different subsets of one or more network parameters.

In another exemplary aspect, a wireless communication method is disclosed. The method includes transmitting a mapping between two reference signals, each of which is configured with different subsets of one or more network parameters.

In yet another exemplary aspect, a wireless communication method is disclosed. The method includes dividing a plurality of SRS (sounding reference signal) resource sets into a plurality of groups based on network parameters of SRS resources or SRS resource sets, and transmitting, within one of the plurality of groups, only one SRS resource in each of multiple SRS resource sets at an identical time, where the SRS resources in different SRS resource sets can be transmitted simultaneously.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 4 shows an example of a wireless communication method.

FIG. 5 shows another example of a wireless communication method.

DETAILED DESCRIPTION

Fifth Generation (5G) communication systems are poised to provide increasing throughputs to a congested mobile user environment in the millimeter wave spectrum (roughly above 10 GHz) using micro and picocell networks. These frequencies offer increased bandwidth but operate in propagation conditions that are harsher than at the lower frequencies traditionally used for wireless services, especially in terms of robustness. To deal with these channel impairments, 5G and NR cellular networks may configure transmission links using reference signal mapping (e.g. by establishing highly directional transmission links) to sustain an acceptable communication quality for the users. In an example, directional links, which require fine alignment of the transmitter and receiver beams, are achieved through a set of operations known as beam management.

In multi-CC (component carrier) aggregation transmission, for intra-band CA (in-band carrier aggregation), the RF (radio frequency) of the UE may be shared for multiple CCs on the intra-band, and the UE simultaneously receives the beam. This ability is also available when using a single CC. These CCs belong to the same CC group, e.g. in the same intra-band or share the same antenna connectors. However, in the current NR beam management architecture, if the parameter carriers in the CSI reporting configuration are different, the channel state information (CSI) feedback is performed independently for each CC, and there is no direct relationship between the CC feedbacks.

The base station may better implement multi-CC aggregation scheduling, the relationship between an RS (reference signal) and RS corresponding feedback for downlink (DL) beam management on different CC/BWP based on the disclosed technology.

Figure 1:
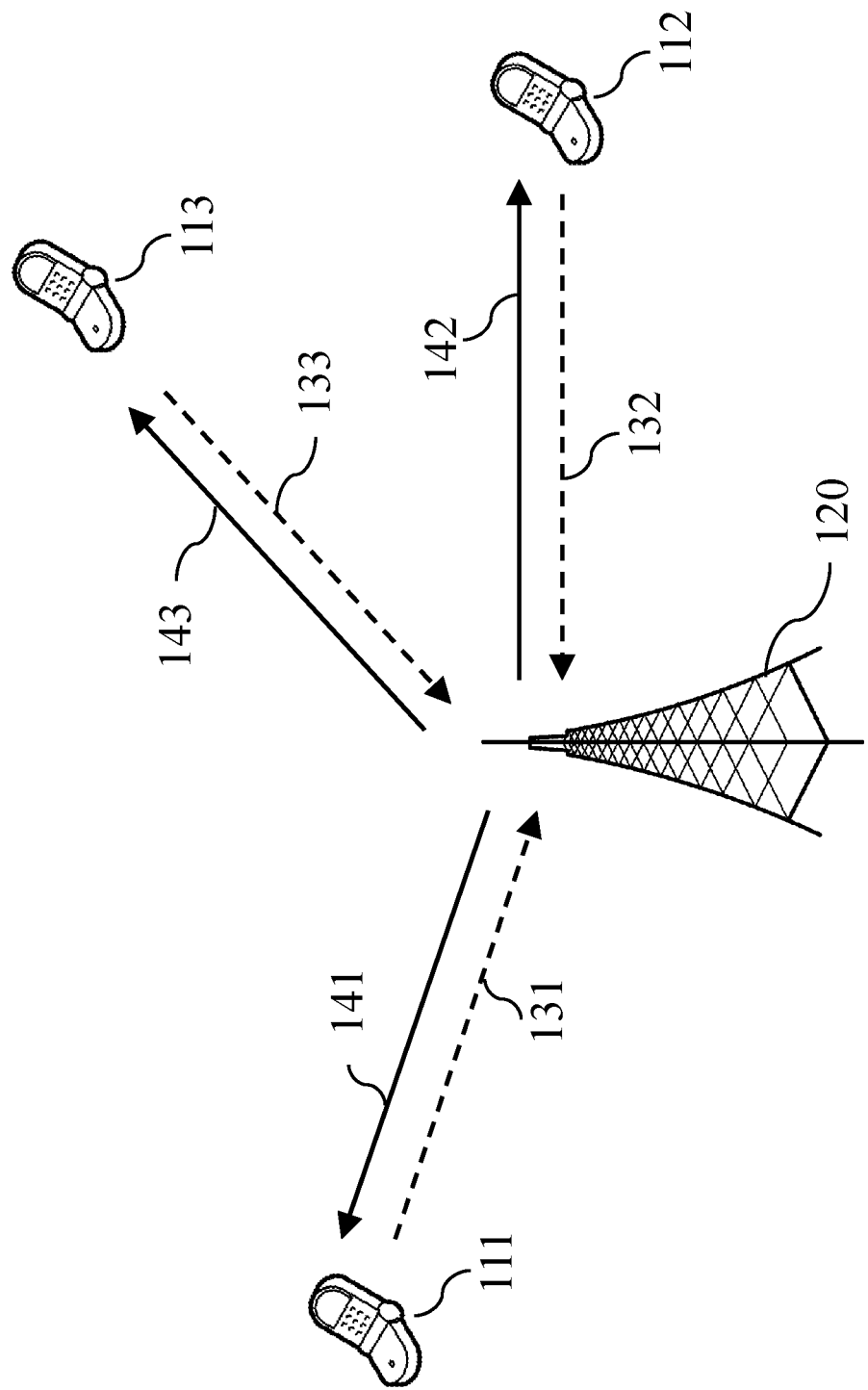
FIG. 1 shows an example of a base station (BS) and user equipment (UE) in wireless communication, in accordance with some embodiments of the presently disclosed technology.

FIG. 1 shows an example of a wireless communication system (e.g., a 5G or NR cellular network) that includes a BS 120 and one or more user equipment (UE) 111, 112 and 113. In some embodiments, the UEs may feedback CSI (131, 132, 133) to the BS, which allows it perform beam management for subsequent communication (141, 142, 143) from the BS to the UEs. The UE may be, for example, a smartphone, a tablet, a mobile computer, a machine to machine (M2M) device, an Internet of Things (IoT) device, and so on. Section headings are used in the present document to improve readability of the description and do not in any way limit the discussion or the embodiments (and/or implementations) to the respective sections only.

1. Examples of Existing Implementations

For the downlink, the synchronization signal block (SSB, or synchronization/PBCH block) and CSI-RS can be used for downlink beam management. The current NR architecture design specifies that the base station may configure a CSI reporting configuration (CSI-ReportConfig, or reporting setting) for the UE, and then configure one or more CSI resource configurations (CSI-ResourceConfig or resource setting) for each CSI reporting configuration. In one CSI resource configuration, one resource set can be transmitted. This resource set can contain several CSI-RS resources or SSBs for beam management. For DL beam management, the UE is configured with a CSI-ReportConfig with reportQuantity set to "cri-RSRP", "none" or ssb-Index-RSRP (Reference Signal Received Power). If the resource is a CSI-RS, then the "repetition" parameter must be configured in the resource set. When the repetition is off, the UE needs to select a best CSI-RS resource from the CSI-RS resource set and then report a CRI (CSI-RS resource indicator) to the base station. The CRI corresponds to the selected CSI-RS resource in the resource set. If repetition=on, the CRI may not be reported. At this time, the UE performs receive beam sweeping. The UE will select one of the best receive beams to receive, but does not need to report to the base station. If the parameter groupBasedBeamReporting=enable in the CSI reporting configuration, the UE needs to report two CRIs or SSBRIs, that is, the UE selects two beams (corresponding to two CSI-RS resources or SSB indices), and the two beams can be received by the user at the same time. If the parameter groupBasedBeamReporting in the CSI reporting configuration is disable, the UE needs to report N CRIs or SSBRIs, that is, the UE selects N beams (corresponding to N CSI-RS resources or SSB indices), and N is configurable.

For the uplink, in the current NR architecture, when sending an SRS resource, the base station may configure a spatially related parameter (SRS-SpatialRelationInfo or spatialRelationInfo in 3GPP Technical Specification 38.331) for the UE. For example, the transmitted beam of the SRS resource is the same as the beam of the reference signal configured in the spatially related parameter. The configured reference signals can be SSB, CSI-RS, SRS (the CC and BWP in which they operate are also notified). If the SSB or CSI-RS is configured, the UE uses the same beam as the receiving beam used for receiving the SSB or CSI-RS when transmitting the SRS, which is the intended use of channel reciprocity or beam correspondence. These space-related (or spatially-related) parameters, an example of which is shown in Table 1 below, may not typically be configured for users.

TABLE 1

| Example of spatially-related parameters |
|---|
| SRS-SpatialRelationInfo ::=  SEQUENCE { <br>   servingCellId                       ServCellIndex     OPTIONAL,  -- Need S <br>   referenceSignal                  CHOICE { <br>      ssb-Index                        SSB-Index, <br>      csi-RS-Index                  NZP-CSI-RS-ResourceId, <br>      srs                               SEQUENCE { <br>         resourceId                    SRS-ResourceId, <br>         uplinkBWP                   BWP-Id <br>      } <br>   } <br>} |

The uplink beam management is required at a high frequency. At this time, the UE may be configured with several SRS resource sets. The parameter 'usage'= beam-Management of the set indicates that the SRS resource set is used for beam management. In the configured SRS resource sets for beam management, different SRS resources in each resource set cannot be transmitted at the same time, and SRS resources in different SRS resource sets can be transmitted at the same time. In other words, when the higher layer parameter SRS-SetUse is set to 'BeamManagement', only one SRS resource in each of multiple SRS sets can be transmitted at a given time instant. The SRS resources in different SRS resource sets can be transmitted simultaneously. The available usage options are shown in Table 2.

TABLE 2

| Example of usage parameters | |
|---|---|
| usage | ENUMERATED {beamManagement, codebook, nonCodebook, antennaSwitching}, |

2. Example Embodiments for Downlink (DL) Communication

For downlink beam management, in the single carrier transmission case, the base station may judge what kind of transmission beam to use to perform actual data transmission for the UE according to the feedback of the UE. If the capability of the UE is that at most M beams can be received at the same time, then the base station generally does not schedule the UE to transmit more than M beams at one time, otherwise the user does not have the ability to receive such multiple beams. For example, M=2 means that this UE has 2 antenna panels and can receive a maximum of 2 beams at one time.

In multi-CC aggregation transmission, for the inter-band CA, since independent antenna connectors or RF chains or power amplifiers (PAs) are available, the UE can use a separate radio frequency unit to receive different beams.

In some embodiments, for intra-band CA (in-band carrier aggregation), for multiple CCs on the intra-band, the RF (radio frequency) of the UE may be shared, and the capability of the UE to receive a beam is the same as that of a CC. These CCs belong to the same CC group, e.g., in the same intra-band, or sharing the same antenna connectors or PA.

In the current NR beam management architecture, if the parameter carriers in the CSI reporting configuration are different, the CRI/SSBRI feedback for beam management is performed independently for each CC, and there is no direct relationship between the CC feedbacks.

Currently, CSI reporting configuration and resource configuration are independently configured for each CC, and the index of the CRI/SSBRI feedback is the index of the resource order in the resource set under the resource configuration, and is a local variable in the resource set. For example, even if the CSI-RS resource IDs on different CCs are the same, the beam is not necessarily the same. In this manner, when the base station actually sends a signal, it may be difficult determine whether the beams on multiple CCs can be simultaneously received by the UE in the case of CA, mainly for the intra-band CA.

For example, it is assumed that the capability of the UE is 1 (e.g., M=1). When two CCs are aggregated, the CRI fed back by the UE on CC0 is 0, which corresponds to the first CSI-RS resource in the resource set configured on CC0. At the same time, the CRI fed back by the UE on CC1 is equal to 1, which corresponds to the second CSI-RS resource in the resource set configured on CC1. The CSI-RS resources on CC0 and CC1 are configured separately. The base station has no way to know whether the CSI-RS resource corresponding to CRI=0 on CC0 and the CSI-RS resource corresponding to CRI=1 on CC1 can be simultaneously received by the UE. Assuming that CRI=0 on CC0 and CRI=1 on CC1 correspond to the same UE receiving beam, the base station may use this beam to schedule data signals or reference signals on CC0 and CC1. Otherwise, it cannot (because the UE's capability is only 1).

Establishing the relationship between RS and RS, and between corresponding feedback for DL beam management on different CC/BWP advantageously enables the base station to better implement multi-CC aggregation scheduling.

In some embodiments, the UE feeds back the CSI-RS resource or SSB indices used for beam management on different CC/BWPs, thereby indicating whether or not the CSI-RS resource/SSB can be simultaneously received by the UE. In order to save overhead, the UE may only feedback a part of the CSI-RS resources/SSB used for beam management on different CC/BWPs to indicate whether the CSI-RS resources/SSB may be simultaneously received by the UE. After the UE feeds back the CRI/SSBRI on each CC/BWP, it can further feedback whether the reference signals corresponding to these CRI/SSBRI on different CC/BWPs can be received simultaneously or not.

In existing implementations, the carrier of the RS configured in the CSI reporting configuration is determined by the parameter carrier in the CSI reporting configuration. In different CSI reporting configurations, the values set by the carrier parameters may be different (e.g., corresponding to different CCs). Establishing the relationship between RS and RS corresponding feedback for DL beam management on different CC/BWPs is equivalent to establishing the corresponding CSI-RS resource or SSB relationship in different CSI reporting configurations. For example, for beam management, the UE feedbacks the RS relationship or mapping among different CSI reporting configurations to indicate (i) whether the CSI-RS resources or the SSB linked to different CSI reporting can be simultaneously received by the UE, or (ii) whether the reference signals corresponding to the CRI/SSBRI linked to different CSI reporting can be simultaneously received or not.

In some embodiments, feeding back the reference signals relationship in different CSI reporting configurations may include adding one or more reporting parameters to each CSI reporting configuration, which may be used to indicate the corresponding use in the current CSI reporting configuration. The corresponding CSI-RS resource or SSB used for beam management in the CSI-RS resource or SSB of the beam management and the CSI-RS resource or SSB in the newly added CSI reporting configuration can be received at the same time or not. In one example, the newly added parameter may include the index of the CC and the ID of the CSI reporting configuration under the CC. In another example, the index of the newly added CC (which may also include the index of the BWP) may be different from the value of the parameter carrier in the current CSI reporting configuration.

In some embodiments, and to minimize overhead, the relationship between the CSI-RS resource/SSB corresponding to the CRI/SSBRI fed back in the current CSI reporting configuration and the CSI-RS resource/SSB corresponding to the CRI/SSBRI fed back in the newly added CSI reporting configuration may be reported. The CRI/SSBRI fed back in the newly added CSI reporting configuration may be the latest CRI/SSBRI feedback from the UE.

For example, in the parameters cri-RSRP and ssb-Index-RSRP in the CSI reporting configuration, one or more parameters are added. Each parameter includes one carrier parameter and one or more CSI reporting configuration parameters. For example, {Carrier, CSI-ReportConfigID} indicates that the UE needs to report whether the reference signal corresponding to the current CSI reporting configuration and the corresponding reference signal in the CSI reporting in the CSI-ReportConfigID on the Carrier can be received at the same time or not.

For example, a CSI reporting configuration parameter includes: reportConfigId=0, carrier=0 (indicating that the RS corresponding to the CSI reporting configuration is sent on carrier 0), groupBasedBeamReporting=enable (assuming that the UE needs to report 2 CRIs), and reportQuantity=cri-RSRP. In other words, the UE feeds back two CRIs in the CSI-RS resource set corresponding to carrier 0 and reportConfigID=0, expressed as CRI0 and CRI1. In accordance with the disclosed technology, a new parameter is added. This parameter may include: carrier=1, reportConfigId=0. Meanwhile, the UE may also need to feedback whether the CSI-RS resource corresponding to the X CRIs corresponding to the reportConfigId=0 on the carrier 1 and the CRI0 and CRI1 on the carrier 0 can be received at the same time. For example, if X=1 and the corresponding CRI on carrier 1 is CRI0', then the UE needs to feedback whether the CSI-RS resource corresponding to CRI0' can be received simultaneously with CSI-RS resources corresponding to CRI0 and CRI1.

In some embodiments, and compared to the current NR feedback mechanism, the UE needs to feedback 2 bits more. The first bit indicates whether CRI0' and CRI0 can be received simultaneously. For example, 1 can indicate that they can be received at the same time, and 0 can indicate that this functionality is not supported. The second bit indicates whether CRI0' and CRI1 can be simultaneously received. Assuming that the UE needs to feed back N1 CRI/SSBRIs in the current CSI reporting configuration, and the number of CRI/SSBRIs corresponding to the feedback in a newly added parameter is N2, the UE needs to feed back N1*N2 bits for this newly added parameter, which further indicates whether previously fed back N2 CRI/SSBRI and N1 CRI/SSBRI corresponding RSs can be received at the same time.

In some embodiments, and compared to the current NR feedback mechanism, the amount of UE feedback needs to be more, but the base station can use these additional feedbacks to determine which beams can be shared among multiple CCs and which are not, thus reducing erroneous scheduling and making up for the deficiency of the current mechanism of NR.

As described above, one or more parameters can be added in a CSI reporting configuration, where each parameter includes one carrier parameter and one or more CSI reporting configuration ID, which results in the UE needing to feedback CSI in the current CSI reporting configuration. The relationship between the RS corresponding to the current CSI reporting configuration and the RS corresponding to the newly added CSI reporting configuration indicates whether the RS can be received at the same time. It may also mean that the spatial parameters of the RS are the same (e.g., the spatial domain transmission filter is the same) or the ports are the same or the beam is the same. Because the spatial-parameter/port/beam is the same, it means that it can be received simultaneously. Since the time domain types of different CSI reporting configurations may be different (e.g., periodic, semi-persistent, or aperiodic), the time-domain types of the reference signals corresponding to different CSI reporting configurations may be different, or the reference signals corresponding to different CSI reporting configurations may be different. The resource set includes the "repetition" parameter, which may have different values, or whether the TCI (Transmission Configuration Indicator) configuration in the reference signal corresponding to different CSI reporting configurations that carries the type D qcl-Type may be different. The disclosed technology uses, but is not limited to, the following parameters to indicate corresponding feedback relationship for RS and/or RS used in beam management: BWP, CC, time domain type (e.g., period, aperiodic, semi-persistent), whether to configure spatial parameters (or whether to configure Type D qcl-Type in TCI), configuration of the argument (e.g., on/off). An example of the current configuration report is shown in Table 3.

TABLE 3

Example of a configuration report

```
-- ASN1START
-- TAG-CSI-REPORTCONFIG-START
CSI-ReportConfig ::=   SEQUENCE {
    reportConfigId                      CSI-ReportConfigId,
    carrier                             ServCellIndex
    OPTIONAL,  -- Need S
    resourcesForChannelMeasurement      CSI-ResourceConfigId,
    csi-IM-ResourcesForInterference     CSI-ResourceConfigId        OPTIONAL,  --
Need R
    nzp-CSI-RS-ResourcesForInterference    CSI-ResourceConfigId  OPTIONAL,
    -- Need R
    reportConfigType                    CHOICE {
        periodic                            SEQUENCE {
            reportSlotConfig                    CSI-ReportPeriodicityAndOffset,
            pucch-CSI-ResourceList                 SEQUENCE (SIZE
(1..maxNrofBWPs)) OF PUCCH-CSI-Resource
        },
        semiPersistentOnPUCCH           SEQUENCE {
            reportSlotConfig                    CSI-ReportPeriodicityAndOffset,
            pucch-CSI-ResourceList                 SEQUENCE (SIZE
(1..maxNrofBWPs)) OF PUCCH-CSI-Resource
        },
        semiPersistentOnPUSCH           SEQUENCE {
            reportSlotConfig                    ENUMERATED (s15, s110, s120, s140,
s180, s1160, s1320),
            reportSlotOffsetList            SEQUENCE (SIZE (1..
maxNrofUL-Allocations)) OF INTEGER(0..32),
            p0alpha                             P0-PUSCH-AlphaSetId
        },
        aperiodic                           SEQUENCE {
            reportSlotOffsetList            SEQUENCE (SIZE
(1..maxNrofUL-Allocations)) OF INTEGER(0..32)
        }
    },
    reportQuantity                      CHOICE {
        none                                NULL,
        cri-RI-PMI-CQI                      NULL,
        cri-RI-i1                           NULL,
        cri-RI-i1-CQI                       SEQUENCE {
            pdsch-BundleSizeForCSI              ENUMERATED (n2, n4)
        OPTIONAL
        },
        cri-RI-CQI                          NULL,
        cri-RSRP                            NULL,
        ssb-Index-RSRP                      NULL,
        sri-RI-LI-PMI-CQI                   NULL
    },
```

In other embodiments, multiple CSI resource configurations in different CC/BWP can be configured in a single CSI reporting configuration. The UE needs to feedback which CSI-RS resources/SSB in which CC/BWP can be received simultaneously or not.

3. Example Embodiments for Uplink (UL) Communication

For uplink beam management, when SRS is used for beam management, an SRS resource set can be seen as an SRS beam that can be transmitted by an antenna panel. Since a panel generally has only one RF or antenna connector, a signal can be transmitted in only one direction at a time; e.g., a beam corresponding to an SRS resource in the SRS resource set. The number of SRS resource sets used for beam management corresponds to the number of UE panels. Different panels are configured with different RF or antenna connectors, so there are several panels that can transmit several beams at the same time. When configuring the SRS, the base station configures the number of UE SRS resource sets and the number of resources per set according to the capability report of the UE for beam management.

In some embodiments, when the initial beam training is performed and the channel reciprocity is not established, the base station configures the UE with M1 resource sets according to the capability feedback of the UE and the parameter 'usage'=beamManagement, and configures M2 resources for each resource set, and each resource does not carry space-related parameters. The UE will use M1 panels. Each panel sends out a total of M2 SRS resources corresponding to M2 different beams at different times. So a total of M1*M2 SRS resources for beam management correspond to a total of M1*M2 beams. The M2 beams under each SRS resource cannot be sent at the same time because they come from the same panel. The UE sends at most M1 beams at one moment, respectively from M1 SRS resource sets.

In some embodiments (e.g., in a single CC transmission), a predefined beam management relationship may be established between the UE and the base station. This predefined relationship can allow the base station to avoid beam scheduling errors. For example, the base station will not schedule multiple beams transmitted by the same UE panel at the same time, because the UE cannot support this functionality.

In other embodiments (e.g., when scheduling multiple CCs and especially for intra-band CA scheduling), the SRS beam management under different CCs or BWPs in the current NR protocol is performed separately. In particular, when the SRS resource set used for beam management is not configured with spatial correlation parameters, the beam management of each CC/BWP does not have any correlation relationship. This increases the probability that the base station may make a scheduling error.

Figure 2:
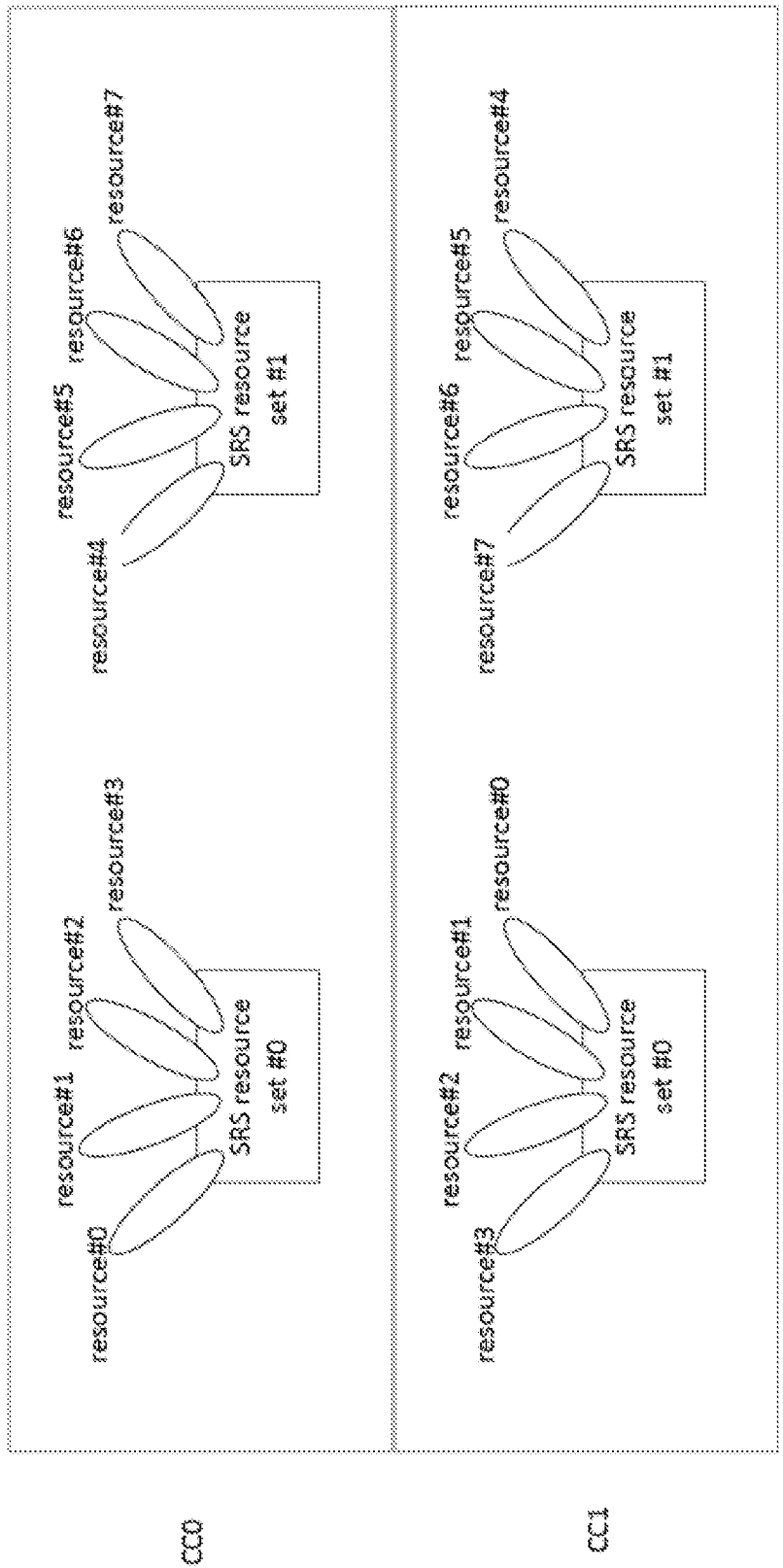
FIG. 2 shows an example of uplink beam management for multiple CCs.

FIG. 2 shows an example of uplink beam management for multiple CCs. As shown in FIG. 2, and since there is no space-related parameter configuration, the SRS transmission beam direction is completely implemented by a UE. If the beam directions of the four SRS resources under SRS resource set #0 on CC0 and the beam directions of the four SRS resources under SRS resource set #0 on CC1 do not satisfy a one-to-one correspondence, then if the base station is adjusting the beam direction sent by the resource #0 to the beam direction scheduled on the CC0, and the beam direction sent by the resource #0 is also scheduled on the CC1. In some embodiments, resource #0 of CC0 and CC1 represents different beam directions and come from the same panel, and thus these two beams cannot be sent by the UE at the same time, which will lead to a scheduling error.

The problem of fuzzy beam management between different CC/BWPs (as described in the context of FIG. 2) may be addressed by establishing a correspondence between SRSs used for beam management between different CC/BWPs. In general, these CCs belong to the same CC group (e.g., multiple CCs in the same intra-band). These CCs share the same RF or antenna connector, or the same PA. The relationship here refers to the correspondence or the mapping between SRS resources or resource sets between different CC/BWPs. The correspondence between two SRS resources means that they share the same spatial parameters (spatial domain transmission filter) or the same port or the same transmission beam, and the two resources having the corresponding relationship can be simultaneously transmitted by the UE.

(1) Embodiments based on the resource or resource set ID. The IDs of the resource or resource set may be used to determine the corresponding relationship. In one example, the correspondence may be between resources with the same resource ID on different CCs/BWPs. In another example, the correspondence may be between resource sets with the same resource set ID on different CC/BWPs (assuming that resources in these sets with the same resource set ID have a one-to-one correspondence). In yet another example, the ResourceConfig structure can contain 1 or more SRS resource sets, and ResourceConfig with the same ID corresponds to each other. When the ResourceConfig ID is the same, the resource set configured below corresponds to the sequence one by one. The resource under the corresponding resource set corresponds to the sequence one by one.

(2) Embodiments based on a predefined correspondence. The resource set for beam management between different BWP/CC is predefined to have a one-to-one correspondence.

(3) Embodiments based on RRC signaling or MAC signaling. Radio Resource Control (RRC) and Medium Access Control (MAC) signaling may be used to configure the correspondence between resource set/resource/resourceConfig and BWP/CC parameters.

In one example, one or more parameters may be added under one SRS resource, each parameter is configured with a CC, a BWP and another SRS resource under the BWP and CC. This newly added parameter may include an SRS resource ID, CC ID, BWP ID, which is used to indicate that there is a correspondence between the current SRS resource and the newly added SRS resource. The CC/BWP ID of the newly added SRS resource may also have a newly added parameter. If multiple parameters are added under the current SRS resource, the SRS resources under multiple CCs/BWPs are related to the current SRS resource.

In another example, one or more parameters are added under an SRS resource set, where each parameter is configured with a CC, a SRS resource set, aBWP and a SRS resource set, or several other resources. The newly added parameter may include an SRS resource set ID or multiple resource IDs, CC IDs, and BWP IDs, and may be used to indicate that the current SRS resource set corresponds to the resource under the newly added SRS resource set (e.g. in a one-to-one correspondence). It may also be used to indicate that the current resource set under the resource set corresponds to the SRS resource contained in the newly added parameter.

The embodiments (1), (2) and (3) described above may be implemented for SRS in beam management (e.g., the case where the parameter usg=beamManagement under the SRS resource set). These embodiments may be combined with the embodiments described below.

4. Example Embodiments for UL Communication Based on Resource Set Grouping

Figure 3:
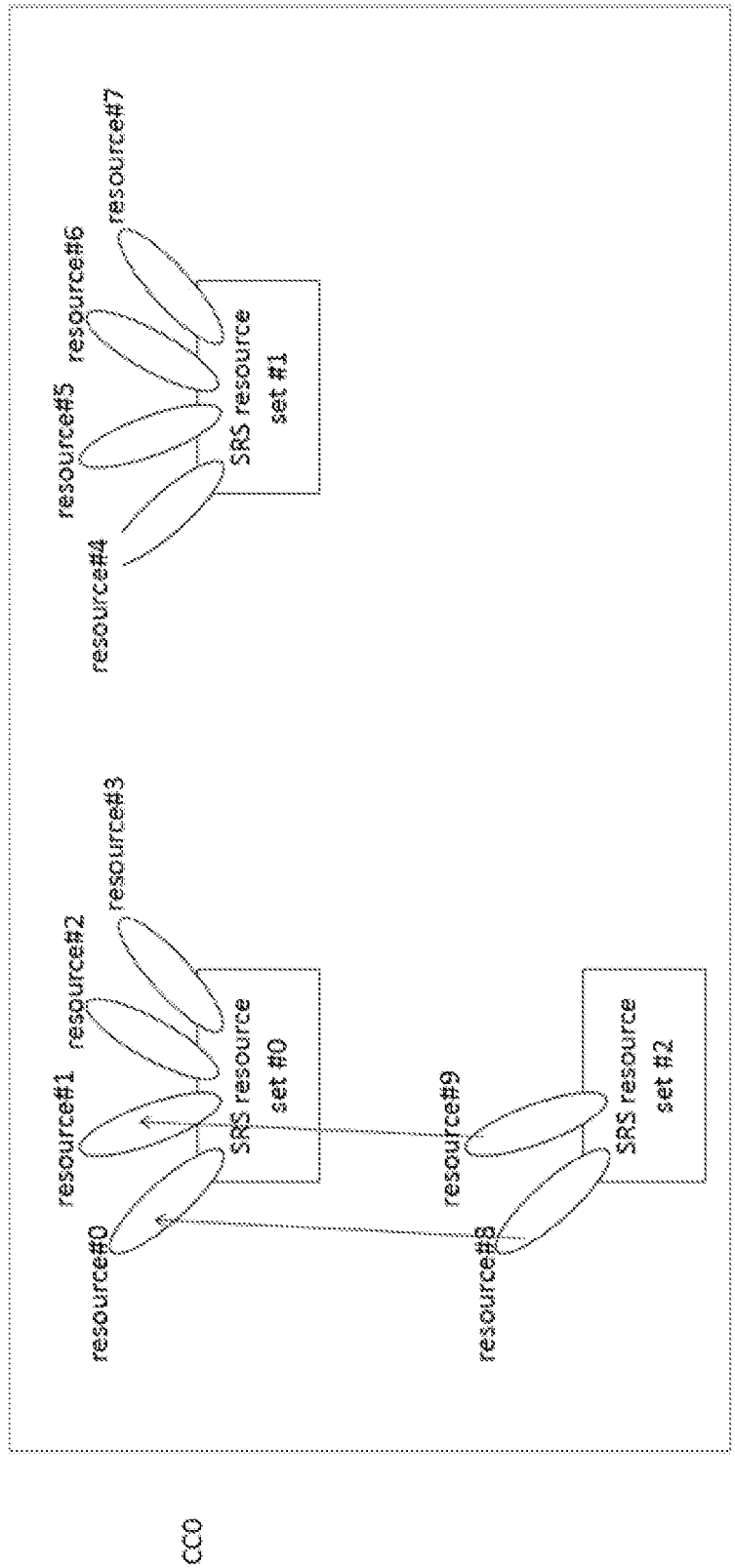
FIG. 3 shows an example of multiple sounding reference signal (SRS) resource sets being used for beam management.

In existing implementations, UL beam management even for single CC transmissions may be problematic. For example, and as shown in FIG. 3, three SRS resource sets may be configured for beam management under a CC0 and BWP0. There are no space-related parameters for all the resources under the first two SRS resource sets (e.g. set #0 and set #1), and each SRS resource under the third SRS resource set (e.g. set #2) is configured to use spatial-related parameters, which includes the SRS resource ID corresponding to some resources of the first SRS resource set. In an example, the RS of the spatial correlation parameter of SRS resource #8 and #9 may be the SRS resource #0 and #1 respectively under SRS resource set #0. According to the current NR mechanism, SRS resources under different SRS resource sets can be sent at the same time. This means that resource #0 and #9 can be sent at the same time. However, resource #0 and #9 are sent from the same panel and cannot be sent at the same time because the beam of resource #9 is the same as the beam of resource #1, which contradicts the current NR mechanism.

The apparent contradiction described in the context of FIG. 3 may be resolved by UL beam management that multiplexes based on the properties of the SRS resource or the SRS resource set. SRS resource sets are grouped, and SRS resource sets in one of some groups is satisfied after grouping. As the rule noted earlier, different SRS resources in each resource set cannot be sent at the same time, whereas SRS resources in different SRS resource sets can be sent at the same time, and only one SRS resource can be sent in an SRS resource set at each time. The grouping of the SRS resource sets may be based on, but is not limited to, the following properties:

Property 1: Whether all SRS resources under SRS resource set contain space-related parameters. For example, an SRS resource set containing spatially related parameters belongs to the same SRS resource set group, e.g. group #0 and a SRS resource set without spatially related parameters belongs to another SRS resource set group, e.g. group #1. After grouping, at least within the group #1, the following rule should be satisfied: different SRS resources in each resource set cannot be sent at the same time, and SRS resources in different SRS resource sets can be sent at the same time, and only one SRS resource can be sent in an SRS resource set at each time. For the group #0, the rule may be satisfied or not.

Property 2: If all SRS resources under the SRS set contain spatially dependent parameters, then the type of RS in the spatially related parameters may be used to implement the grouping (e.g., the RS may be CSI-RS, SSB or SRS).

In one example, SRS resource sets that do not contain spatially related parameters belong to an SRS resource set group #0, the space-related parameters are the SRS resource sets belonging to the SRS resource set group #1, and the space-related parameters are the CSI-RS resource sets belonging to the SRS resource set group #2.

In another example, the RS types in the spatial parameters are grouped by SRSs. If the spatial parameters of SRS resources under one or some SRS resource sets are all SRSs, whether or not the SRS resources under the RS resource sets can be sent at the same time depends on whether SRSs in the corresponding spatial parameters can be sent at the same time, e.g., if the configured SRS resources in the space-related parameters in the two SRS resources are the same or can be sent at the same time, the two SRS resources can be sent at the same time.

Property 3: All SRS resource time domain types (semi-persistent, periodic, aperiodic) under SRS resource. For example, aperiodic SRS resource sets belong to an SRS resource set group #0, semi-persistent SRS resource sets belong to an SRS resource set group #1, and periodic SRS resource sets belong to an SRS resource set group #2.

Property 4: SRS set belongs to CC and or /BWP. For example, resource sets that belong to the same CC and BWP, then belong to the same SRS resource set group.

Property 5: Based on the value of the repetition parameter. In an example, if the two SRS resources contain the same spatial parameters, and the SRS resource set arguments of the two SRS resources are set to off, there 2 SRS resources cannot be sent at the same time. In another example, if the two SRS resources contain the same spatial parameters and the spatial parameters are the same SRS resource, then these three SRS resources cannot be sent at the same time. In yet another example, if the two SRS resources contain the same spatial parameters as the other SRS resources, these three SRS resources cannot be sent at the same time. In some embodiments, the spatial parameters may include SRS, CSI-RS or SSB. If the repetition is on for one SRS resource set, the SRS resources within the resource set may be transmitted with the same spatial transmission filter.

Property 6: Based on combining two of Properties 1-5. For example, SRS resource sets belonging to the same CC/BWP and time domain type are the same group.

In some embodiments, the above rules may be used for SRS resource sets for beam management (e.g., if the property of the set is different, then the set group is different). In addition, after grouping, only some groups may meet the rule. For example, only groups carrying SRS resource sets that do not carry space-related parameters may be selected and satisfy the rule (within the group, different SRS resources in each resource set cannot be sent at the same time, and SRS resources in different SRS resource sets can be sent at the same time, and only one SRS resource can be sent in an SRS resource set at each time), while other groups may not satisfy the rule.

In some embodiments, the rule within the group is that when the higher layer parameter SRS-SetUse is set to 'BeamManagement', only one SRS resource in each of multiple SRS sets can be transmitted at a given time instant. The SRS resources in different SRS resource sets can be transmitted simultaneously.

In some embodiments, when the high-level parameter usage=beamMangement, each set of multiple SRS resource sets can have only one SRS resource sent at a time, and SRS resources in different SRS resource sets can be sent at the same time. At this point, the properties of these SRS resource sets must be the same and belong to the same group. SRS resource sets in different groups may not satisfy these rules.

5. Exemplary Methods Based on the Disclosed Technology

The use of beam management to improve throughputs in next generation cellular networks is elucidated in the following examples described for various implementations.

Example 1. The disclosed technology can establish a relationship between RS and/or RS correspondence feedback for beam management based on RS configuration fields.
  (a) RS includes at least one of SRS, CSI-RS, SSB or TRS,
  (b) The relationship between RS refers to the relationship between at least one of the following: RS resource, RS resource set or RS resourceConfig,
  (c) The configuration domain refers to a combination of one or more of the following parameters: BWP, CC, time domain type (period, aperiodic, semi-persistent), whether to configure spatial parameters, configuration of the repetition parameter value (on/off), and the type of RS contained in the spatial parameter.

Example 2. Based on Example 1, the correspondence of reference signals for beam management may be established in different configuration domains.

Example 3. Based on Example 1, a correspondence relationship between RSs used for beam management in different CSI reporting configurations may be established.

Example 4. Based on either Examples 2 or 3, the values of CCs or BWPs in different configuration fields or different reporting configurations may be different.

Example 5. Based on Example 3, one or more reporting parameters are newly added in each CSI reporting configuration for indicating the corresponding relationship between the corresponding RS in the current CSI reporting configuration and the corresponding RS in the newly added CSI reporting configuration.

Example 6. Based on any of Examples 2-5, RS refers to a reference signal corresponding to CRI/SSBRI.

Example 7. Based on Example 5, the newly added parameter may contain CC or BWP information.

Example 8. Based on Example 1, the configuration domain parameters will be based on SRS resource set. SRS resource sets are grouped and the SRS resource sets in the group are satisfied after grouping. Different SRS resources in each resource set cannot be sent at the same time. SRS resources in different SRS resource sets can be sent at the same time, and only one SRS resource can be sent in an SRS resource set at each time.

Example 9. Based on Examples 2 or 4, the correspondence is determined based on the ID of the resource or resource set.

Example 10. Based on Examples 2 or 4, configuring correspondences using Radio Resource Control (RRC) signaling or Medium Access Control (MAC) signaling.

The examples described above may be incorporated in the context of the methods described below, e.g., methods 400, 500 and 600.

FIG. 4 shows a flowchart for an exemplary method for wireless communication. The method 400 includes, at step 410, transmitting data over at least one transmission link that is configured based on a mapping between two reference signals, each of which is configured with different subsets of one or more network parameters.

FIG. 5 shows a flowchart for another exemplary method for wireless communication. The method 500 includes, at step 510, transmitting a mapping between two reference signals, each of which is configured with different subsets of one or more network parameters.

In some embodiments, the method 500 may further include the step of receiving data over at least one transmission link that is configured based on the mapping.

The methods 400 and 500 may further include each of the two reference signals including a sounding reference signal (SRS), a channel-state information reference signal (CSI-RS) or a synchronization signal block (SSB, or synchronization/PBCH block), and the one or more network parameters including a bandwidth path (BWP), a component carrier (CC), a time-domain communication type, spatial parameters or a value of a repetition parameter.

In some embodiments, the mapping in methods 400 and 500 is between a first CSI-RS resource or SSB and a second CSI-RS resource or SSB, where the first and second CSI-RS resources or SSBs are in different CCs or BWPs, and the mapping specifies whether or not multiple CSI-RS resources or SSBs corresponding to the different CCs and BWPs can be received simultaneously.

In some embodiments, the mapping in methods 400 and 500 is between a first CSI-RS resource or SSB and a second CSI-RS resource or SSB, where the first and second CSI-RS resources or SSBs are linked to different CSI reporting configurations, and the mapping specifies whether or not multiple CSI-RS resources or SSBs corresponding to the different CSI reporting configurations can be received simultaneously. In an example, the CSI reporting configurations are linked to different CCs or BWPs.

In some embodiments, the mapping between the first CSI-RS resource or SSB and the second CSI-RS resource or SSB corresponds to a CRI (CSI-RS resource indicator) or an SSBRI (SS/PBCH block resource indicator).

In some embodiments, a new parameter may include (i) an index of the CC or an index of the BWP, and (ii) an identification of a CSI reporting configuration that is configured within the CSI reporting configuration, where the mapping is between the first CSI-RS resource or SSB linked to the CSI reporting configuration and the second CSI-RS resource or SSB linked to the new parameter.

In some embodiments, the mapping in methods 400 and 500 is between a first SRS resource and a second SRS resource, and the mapping specifies whether or not multiple SRS resources corresponding to the different subsets of the one or more network parameters can be transmitted simultaneously. In an example, the mapping may be based on an identification of the SRS resources or an identification of resource sets which have the different subsets of the one or more network parameters. In another example, the mapping may be configured using radio resource control (RRC) signaling or medium access control (MAC) signaling.

In some embodiments, the mapping in methods 400 and 500 specifies whether multiple reference signals are associated with one or more of an identical spatial domain transmission filter, an identical spatial domain receive filter, an identical antenna port, or an identical beam.

In some embodiments, the transmission link in methods 400 and 500 includes a directional transmission link, and the methods are part of a beam management implementation.

Figure 6:
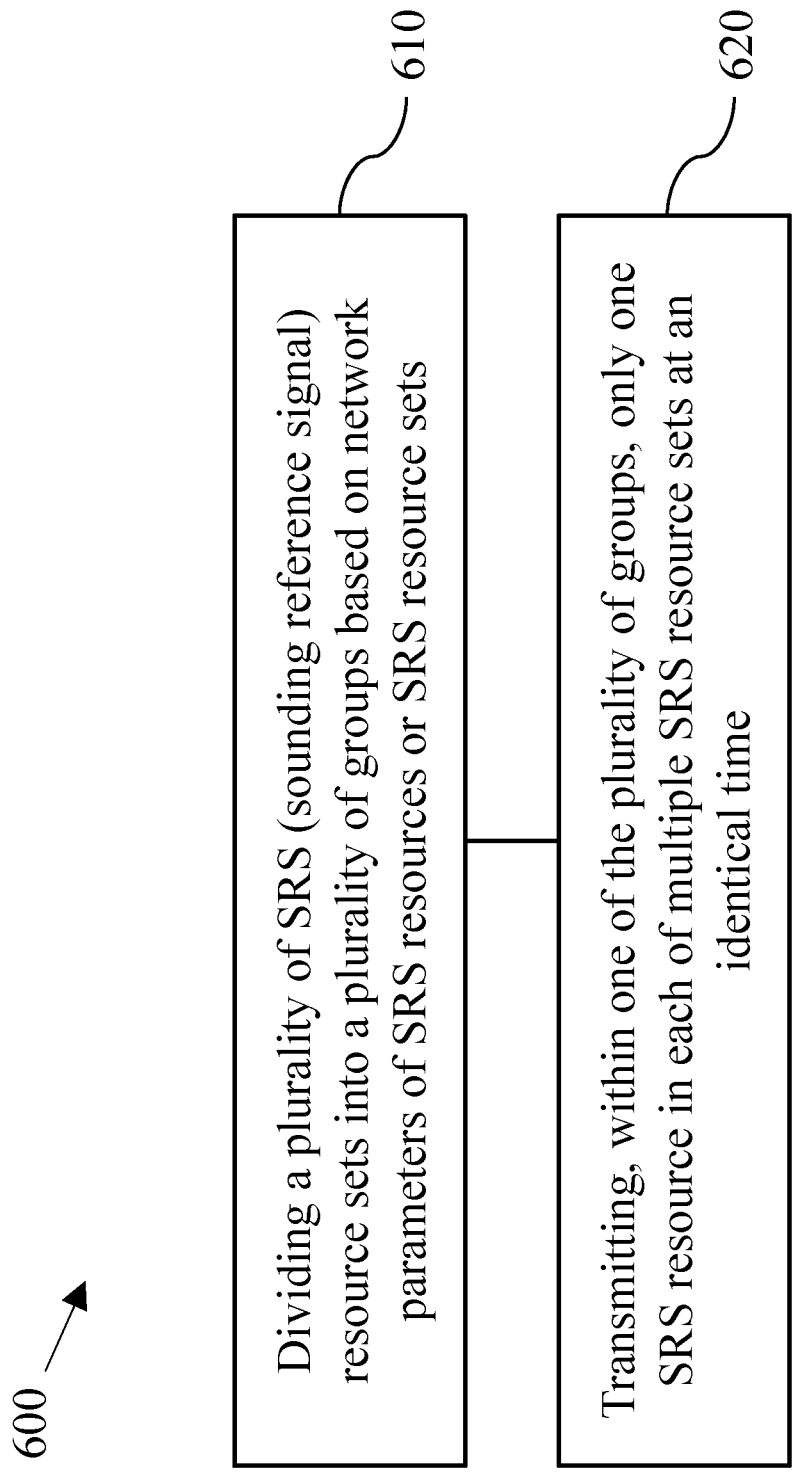
FIG. 6 shows yet another example of a wireless communication method.

FIG. 6 shows a flowchart for yet another exemplary method for wireless communication. The method 600 includes, at step 610, dividing a plurality of SRS (sounding reference signal) resource sets into a plurality of groups based on network parameters of SRS resources or SRS resource sets. In some embodiments, the network parameters include one or more of a time-domain communication type, a component carrier (CC), a bandwidth part (BWP), spatially-related information and a value of a repetition parameter.

The method 600 includes, at step 620, transmitting, within one of the plurality of groups, only one SRS resource in each of multiple SRS resource sets at an identical time. In some embodiments, the SRS resources in different SRS resource sets can be transmitted simultaneously.

In some embodiments, all SRS resource sets with identical values of the network parameters are grouped in the same group of the plurality of groups.

In some embodiments, the time-domain communication type for each SRS resource of a first, second and third group of the plurality of groups is semi-persistent, periodic and aperiodic, respectively.

In some embodiments, all SRS resources in a first group include the spatially-related information, and all SRS resources in a second group exclude the spatially-related information. In an example, the spatially-related information comprises a type of reference signal, and wherein the first group is divided into a plurality of subgroups based on the type of reference signal. In another example, the type of reference signal is one of an SRS, a channel-state information reference signal (CSI-RS) or a synchronization signal block (SSB, or synchronization/PBCH block).

6. Example Implementations of the Disclosed Technology

Figure 7:
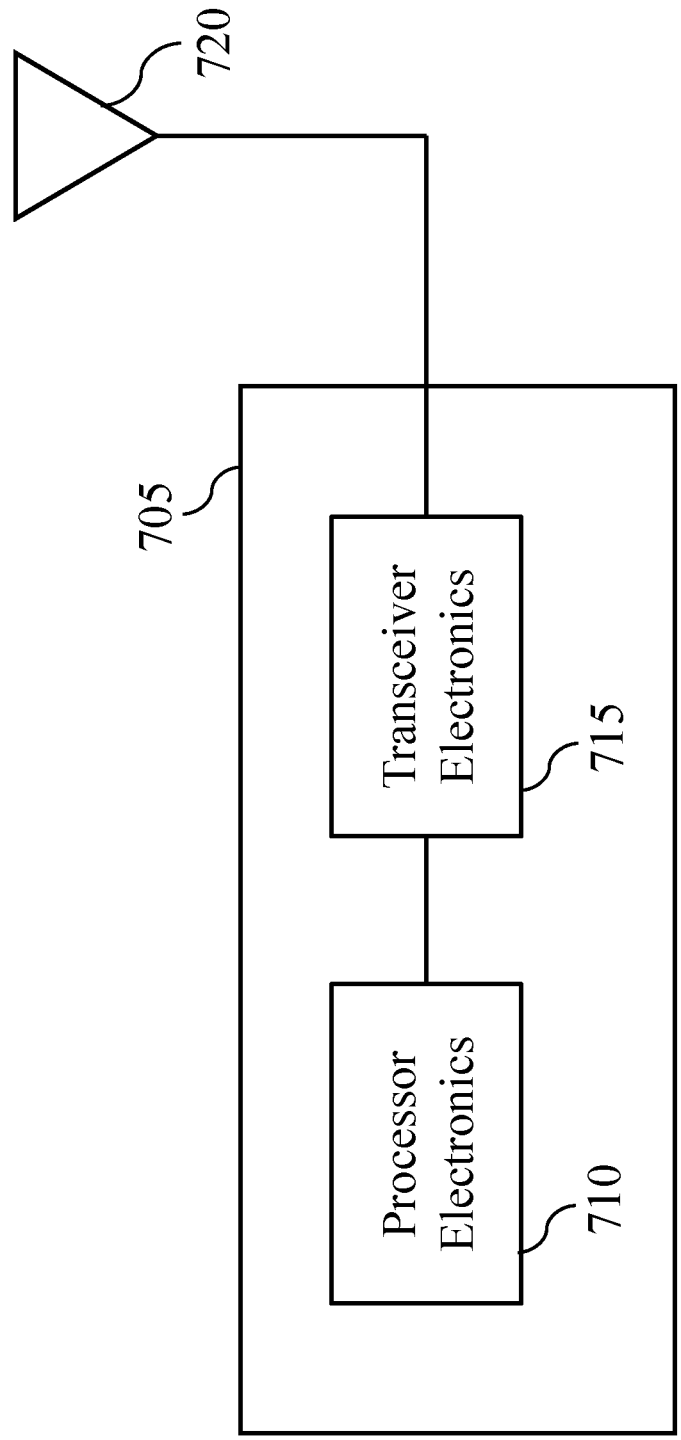
FIG. 7 is a block diagram representation of a portion of an apparatus, in accordance with some embodiments of the presently disclosed technology.

FIG. 7 is a block diagram representation of a portion of an apparatus, in accordance with some embodiments of the presently disclosed technology. An apparatus 705, such as a base station or a wireless device (or UE), can include processor electronics 710 such as a microprocessor that implements one or more of the techniques presented in this document including, but not limited to, methods 400, 500 and 600. The apparatus 705 can include transceiver electronics 715 to send and/or receive wireless signals over one or more communication interfaces such as antenna(s) 720. The apparatus 705 can include other communication interfaces for transmitting and receiving data. Apparatus 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the apparatus 705.

It is intended that the specification, together with the drawings, be considered exemplary only, where exemplary means an example and, unless otherwise stated, does not imply an ideal or a preferred embodiment. As used herein, "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
determining that sounding reference signal, SRS, resources are divided into a plurality of groups based on network parameters of the SRS resources, wherein the network parameters comprise at least a time-domain communication type, or a bandwidth part (BWP) parameter; and
performing a transmission using at least one SRS resource selected from the SRS resources, wherein only one SRS resource in each of the plurality of groups is used at any given time for the transmission, and wherein SRS resources in different groups associated with same time-domain communication type and BWP parameter are transmitted simultaneously.

2. The method of claim 1, wherein the time-domain communication type comprises semi-persistent, periodic and aperiodic.

3. The method of claim 1, wherein the plurality of SRS resources is divided for beam management.

4. A method for wireless communication, comprising:
dividing sounding reference signal, SRS, resources into a plurality of groups based on network parameters of the SRS resources, wherein the network parameters comprise at least a time-domain communication type, or a bandwidth part (BWP) parameter; and
receiving a transmission on at least one SRS resource selected from the SRS resources, wherein only one SRS resource in each of the plurality of groups is used at any given time for the transmission, and wherein SRS resources in different groups associated with same time-domain communication type and BWP parameter are received simultaneously.

5. The method of claim 4, wherein the time-domain communication type comprises semi-persistent, periodic and aperiodic.

6. The method of claim 4, wherein the plurality of SRS resources is divided for beam management.

7. A wireless communications apparatus comprising a processor configured to:
determine that sounding reference signal, SRS, resources are divided into a plurality of groups based on network parameters of the SRS resources, wherein the network parameters comprise at least a time-domain communication type, or a bandwidth part (BWP) parameter; and
perform a transmission using at least one SRS resource selected from the SRS resources, wherein only one SRS resource in each of the plurality of groups is used at any given time for the transmission, and wherein SRS resource in different groups associated with same time-domain communication type and BWP parameter are transmitted simultaneously.

8. The apparatus of claim 7, wherein the time-domain communication type comprises semi-persistent, periodic and aperiodic.

9. The apparatus of claim 7, wherein the plurality of SRS resources is divided for beam management.

10. A wireless communications apparatus comprising a processor configured to:
divide sounding reference signal, SRS, resources into a plurality of groups based on network parameters of the SRS resources, wherein the network parameters comprise at least a time-domain communication type, or a bandwidth part (BWP) parameter; and
receive a transmission on at least one SRS resource selected from the SRS resources, wherein only one SRS resource in each of the plurality of groups is used at any given time for the transmission, and wherein SRS resources in different groups associated with same time-domain communication type and BWP parameter are received simultaneously.

11. The apparatus of claim 10, wherein the time-domain communication type comprises semi-persistent, periodic and aperiodic.

12. The apparatus of claim 10, wherein the plurality of SRS resources is divided for beam management.

* * * * *